United States Patent [19]

Marti et al.

[11] Patent Number: 4,542,921
[45] Date of Patent: Sep. 24, 1985

[54] APPARATUS FOR ACCOMODATING AND COMPENSATING ANGULAR DEFLECTIONS OF PIPE CONDUITS

[75] Inventors: Wilhelm Marti, Horw; Fredy Reichen, Lucerne, both of Switzerland

[73] Assignee: Boa A.G. Luzern, Lucerne, Switzerland

[21] Appl. No.: 467,825

[22] Filed: Feb. 18, 1983

[30] Foreign Application Priority Data

Feb. 25, 1982 [CH] Switzerland ............... 1165/82

[51] Int. Cl.⁴ .............................................. F16L 27/00
[52] U.S. Cl. .................................. 285/114; 285/226; 285/227
[58] Field of Search ............... 285/226, 227, 265, 114, 285/299, 301, 223

[56] References Cited

U.S. PATENT DOCUMENTS

| | | | |
|---|---|---|---|
| 1,958,260 | 5/1934 | Bigger | 285/301 |
| 3,869,151 | 3/1975 | Fletcher et al. | 285/226 |
| 4,158,462 | 6/1979 | Coral | 285/226 |

FOREIGN PATENT DOCUMENTS

| | | | |
|---|---|---|---|
| 87653 | 9/1983 | European Pat. Off. | 285/226 |
| 2616633 | 10/1977 | Fed. Rep. of Germany | 285/226 |
| 2848561 | 5/1980 | Fed. Rep. of Germany | |
| 816157 | 7/1958 | United Kingdom | 285/226 |
| 900661 | 7/1962 | United Kingdom | 285/226 |
| 2034843 | 6/1980 | United Kingdom | 285/226 |
| 2042115 | 9/1980 | United Kingdom | 285/227 |

Primary Examiner—Cornelius J. Husar
Assistant Examiner—Todd G. Williams
Attorney, Agent, or Firm—Anthony A. O'Brien

[57] ABSTRACT

Two rigid cylindrical sleeves are interconnected by a spring bellows. Each cylindrical sleeve carries a flange section. Such flange section is provided with joint plates. The joint plates are a forklike interconnecting structure. A rolling contact wedge member is located in a first number of joint plates and a rolling contact prism member is located in a second number of joint plates. This provides for a hinge-like joint of a rolling contact rocker structure having a line contact only of the parts moving relative to each other. Because no friction exists in such hinge joint, a cold welding is not possible. Accordingly, no additional stresses due to such cold welding will be able to exist in the pipe conduit sections interconnected by this apparatus.

7 Claims, 3 Drawing Figures

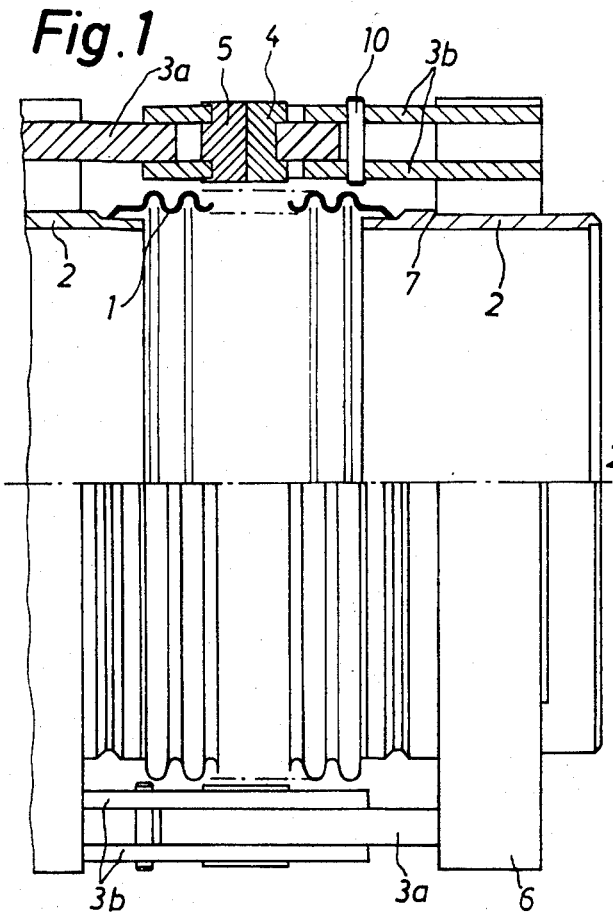
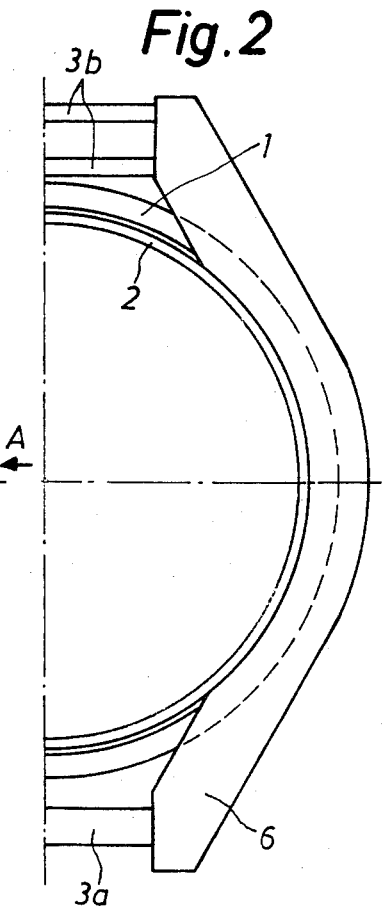
Fig. 1  Fig. 2
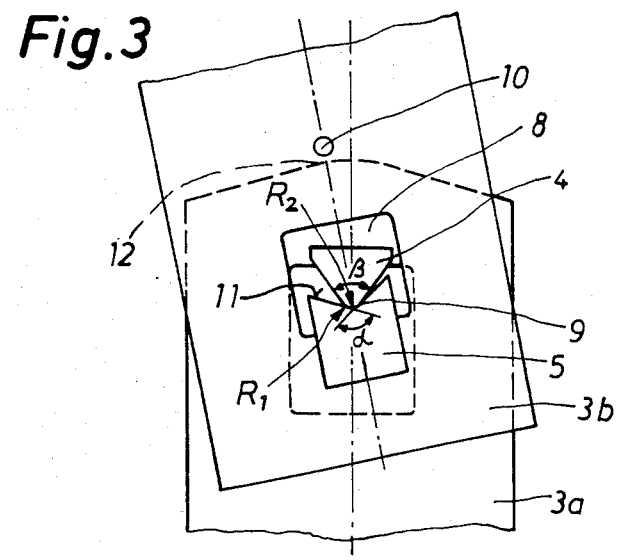
Fig. 3

APPARATUS FOR ACCOMODATING AND COMPENSATING ANGULAR DEFLECTIONS OF PIPE CONDUITS

BACKGROUND OF THE INVENTION

1. Field of the Invention

The present invention relates to an apparatus for accommodating and compensating angular deflections of pipe conduits and including two rigid cylindrical sleeves interconnected by a spring bellows.

The pressure in pipe conduits generated by the medium flowing therethrough generates reactive forces which must be accommodated at the locations where the individual rigid pipe conduit sections are joined to each other.

2. Description of the Prior Art

In order to accommodate and compensate for angular deflections in pipe conduits which may be generated, for instance, by the changes of the temperature and/or pressure of the medium flowing therethrough compensating means are made use of. Known compensators having a hinge joint structure are commonly provided with joint plates which are designed such that the plates are hingedly connected to each other by the agency of a plug such that the joint is basically a sleeve bearing structure. The high pressures prevailing in the pipe conduits lead to the generation of an extremely high surface pressure at the gliding surface present between the plug and the plug bearing. Because in the practical applications no lubrication is provided for such sleeve bearings, there exists the danger that already after a small number of compensating movements a cold welding appears between the plug bearings and the plugs or pivot bearings and pivots, respectively. If now after suffering such cold welding further angular movements are executed, such cold welding condition will lead to extremely strong increase of the forces generated by the angular movements. These extremely high forces lead in turn to an additional strain of the pipe conduit itself. Such additional strains can be taken into consideration when designing pipelines only very approximatively because only little is known with regard to the time at which such cold welding will appear and also with regard to the extent of such cold welding and, accordingly, with regard to the increase of the forces and stresses generated by above condition. At any rate, a high surface pressure between pivot and pivot bearing leads to an exceedingly high wear of these members which in turn detrimentally influences the operational ability and specifically the safety of the complete conduit.

SUMMARY OF THE INVENTION

Hence, it is a general object of the present invention to provide an improved construction of an apparatus for accommodating and compensating angular deflections of pipe conduits.

A further object is to provide an apparatus for accommodating and compensating angular deflections of pipe conduits including two rigid cylindrical sleeves interconnected by a spring bellows, which apparatus comprises a pivot means including a first pivot section intended to be mounted to one of the rigid cylindrical sleeves and a second pivot section intended to be mounted to the other of the rigid cylindrical sleeves, which pivot sections engage each other along a line of contact and form together a rolling contact rocker structure.

Because the two pivot sections support each other in form of a rolling contact rocker structure, no face pressures are present, and there rather exists a hertz-like pressure. Due to the geometrical shape of the rolling contact rocker structure a cold welding is impossible. Accordingly, the forces generated by the movements of the pipe conduit compensator tend to remain constant throughout the useful lifetime thereof and may remain at a value which is only ½ or ⅓ as large as the corresponding forces present in a sleeve bearing. The wear in a rolling contact rocker structure may be negligibly small because at the contact area between rolling contact wedge member and rolling contact prism member the well-known "peeling" can proceed at the surface of the rolling contact prism member which is a well-known appearance in a structure designed to operate in accordance with the laws of the hertz-like pressure generating arrangement. This "peeling" does not detrimentally influence the operation or force stemming from adjusting movements as is well-known because upon a "peeling" the next lower surface layer will form the new contact area for the rolling contact prism member.

According to a preferred embodiment the pivot sections comprise joint plates which are mounted to flange sections which engage in turn pressure shoulders provided on rigid cylindrical sleeves in the shape of short rigid pipe sections. Such structure can guarantee an optimal transfer of the forces into the pipe conduit. The hitherto known common hinge apparatuses comprise joint plates which are welded to the respective cylindrical sleeves, i.e. rigid pipe sections. This leads to a pointwise transfer of the forces into the pipe conduit which can generate deformations of the rigid cylindrical sleeves and finally to a detrimental influence on the operation of the compensator.

Preferably, the flange sections of every pivot part describe a circular section defining an angle less than 180° and the void space between these flange sections is preferably bridged by the joint plates such that the flange sections of a respective pivot section are interconnected by the joint plates. Accordingly, the joint plates of such embodiment are connecting members between individual flange sections. Comparing this preferred design with the design of the known one-piece flange sections extending uninterruptedly around their respective rigid sleeve, such design leads to a further considerable savings on material.

Embodiments of the inventive joint compensator may feature smaller dimensions than comparable known joint compensators having joint plates which are welded directly to the respective sleeve sections. This may lead to a decrease of the necessary space for the mounting thereof and may, furthermore, lead to a decrease of the mounting space necessary, of pits and excavated ground volume for the end user.

A further embodiment of the inventive apparatus is designed such that the apparatus will maintain its safe operation also if vacuum conditions appear or also if a sudden pressure decrease is suffered, which conditions lead to a change of the direction of the reaction forces. Such embodiment comprises a number of joint plates which have a rounded face section defining a section of a circular line whereby the center of the circle described is located on the prevailing point of rolling contact existing between rolling contact wedge member and rolling contact prism member. This joint plate having the rounded face section extends into forked face plates. These forked face plates are provided with a through hole and a pin extends through these holes. Upon a reversal of the direction of the reaction forces the center joint plate located within the fork will abut the pin which is a rounded face section such that a collapse of the pipe compensator is prevented.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a side view of a joint compensator with parts shown in section;

FIG. 2 is a view of the joint compensator in direction of the arrow A of FIG. 1; and FIG. 3 is a view of a rolling contact rocker structure having a rolling contact wedge member and a rolling contact prism member, which members are located in respective cutouts in joint plates.

DETAILED DESCRIPTION OF THE PREFERRED EMBODIMENTS

In FIG. 1 there is shown a spring bellows which is in this embodiment a metal bellows 1 but could be made of rubber or plastic. This metal bellows 1 is welded at both its ends to a cylindrical sleeve 2. These cylindrical sleeves 2 which are basically pipe stubs are intended to be welded to a corresponding section of a pipe conduit, a pipeline and similar. Each sleeve 2 is provided with a pressure shoulder 7 which extends at least partly along its circumference. The pressure shoulders 7 are engaged by flange sections 6. According to the embodiment shown in FIG. 2 every sleeve 2 supports two flange sections 6 which are located diametrically opposite to each other and describe each a section of a circular line extending over less than 180°. The two flange sections 6 located on a respective sleeve 2 are held together by joint plates 3a, 3b which are located in the void space between the respective two flange sections 6. These joint plates 3a, 3b extend in the direction of the longitudinal axis of the sleeve 2. As is shown in FIG. 1, the joint plate 3b located in this FIG. on top of the bellows is a forked structure and the lower joint plate 3a is a simple metal bar. Each joint plate 3a in the form of a metal bar is inserted in a hingelike fashion into the forked joint plates 3b.

In the FIGS. there is shown an embodiment of the apparatus, in which one sleeve 2 carries at its upper side a forked joint plate 3b and at its lower side, i.e. located diametrically opposite thereof, a joint plate 3a in the shape of a simple metal bar 3a. Obviously, further embodiments foresee a symmetrical design in which, for instance, the sleeve 2 located at the left hand side of FIG. 1 is provided exclusively with forked joint plates and the sleeve 2 at the right hand side of the FIG. is provided exclusively with joint plates 3a in the form of a simple metal bar.

Referring now to FIG. 3 it can be seen that a cutout 8 is located in every joint plate 3a, 3b. A rolling contact prism member 5, secured adjacent its ends to joint plates 3b, is located in the cutout 8 of the forked joint plates 3b and a rolling contact wedge member 4, secured at its central portion to metal bar plate 3a, is located in the cutout 8 of the center joint plate 3a, which plate extends into the space between the spaced apart forked joint plates 3b for relative movement in a plane located therebetween. The rolling contact wedge member 4 as well as the rolling contact prism member 5 are thus arrested against lateral movement within the cutouts 8.

The rolling contact prism member 5 comprises a V-shaped groove of which the flanges define an angle $\alpha$. The wedge angle $\beta$ of the rolling contact wedge member 4 is smaller than the angle $\alpha$ of the groove such that a relative pivoting movement between rolling contact wedge member 4 and rolling contact prism member 5 is possible. The bottom of the groove 11 of the rolling contact prism member 5 is rounded and this rounded section has a radius of curvature $R_1$. The apex section of the rolling contact wedge member 4 is also rounded and defines a radius $R_2$. The radius $R_1$ of the rounded section of the bottom of the groove is larger than the radius $R_2$ of the rounded section of the apex section of the rolling contact wedge member 4. Additionally, the rolling contact prism member 5 is made of a material which is softer than the material from which the rolling contact wedge member 4 is made such that the above described well-known "peeling" can occur at the surface of the rolling contact prism member 5. The bar shaped joint plate 3a comprises at its face end a rounded apex section 12 describing a section of a circle. The center of the circle defined by the rounded section is located on the line of contact 9 existing between the rolling contact wedge member 4 and the rolling contact prism member 5. A pin 10 penetrates the two outer joint plates 3b of the fork (see also FIG. 1), which pin 10 is located at a small distance from mentioned apex section 12. Preferably, this distance amounts to about 5/64 inches (2 mm). If now accidentally a subatmospheric pressure condition in a pipe conduit exists, the apex section 12 will move towards pin 10 and abut same. This, however, limits the relative movement of the joint plates 3a, 3b towards each other such that the collapse of the compensator is prevented. Because the apex section 12 is designed with a face having the shape of a section of a circle and because the center of such circle is located on the line of contact 9 between rolling contact wedge member 4 and rolling contact prism member 5, the apex section 12 will safely come to rest onto pin 10 at any relative angular position of the sleeves 2. Accordingly, this pipe compensator is safeguarded against a collapse in any angular position of the pipe sections.

While there are shown and described present preferred embodiments of the invention, it is to be distinctly understood that the invention is not limited thereto, but may be otherwise variously embodied and practiced within the scope of the following claims. Accordingly,

What is claimed is:

1. An apparatus for accommodating and compensating angular deflections of pipe conduits, said apparatus including two rigid cylindrical sleeves each adapted to be joined to a pipe section of a pipe conduit, said sleeves interconnected by a spring bellows, the improvement comprising:

a first pivot section mounted to one of said rigid cylindrical sleeves and a second pivot section mounted to the other of said cylindrical sleeves, said first and second pivot sections each having joint plates that extend towards the other, a rolling contact wedge member carried by the joint plates of one of said pivot sections and having a rounded apex section of a given angle, a rolling contact prism member carried by the joint plates of the other of said pivot sections and having a V-shaped groove the two flanks of which enclose an angle that is greater than the given angle of said rounded apex section of said rolling contact wedge member, said apex of said wedge member positioned in said groove of said prism member so that said wedge member and said prism member engage each other along a line of contact, and said rolling contact prism member being made of a softer material than the material of said rolling contact wedge member, whereby any reactive forces acting on said cylindrical sleeves generate at the line of contact between said rolling contat prism member and said rolling contact wedge member a hertz-like pressure that permits substantially frictionless angular movement between said rolling contact wedge member and said rolling contact prism member.

2. The apparatus of claim 1, wherein each pivot section comprises two flange sections carrying said pivot plates, which flange sections are intended to mount said pivot sections to said respective rigid cylindrical sleeves, the flange sections of a respective pivot section being located diametrically opposite to each other; further wherein the joint plates of said pivot sections and carried by said flange sections are also located diametrically opposite to each other and project from their respective flange section longitudinally thereof; further wherein at least one of said flange sections is provided with forked joint plates and the flange section located in longitudinal direction oppositely thereof comprises one joint plate which projects into said fork; and wherein every joint plate is provided with a cutout, within which a rolling contact wedge member or a rolling contact prism member is located.

3. The apparatus of claim 2, wherein each rigid cylindrical sleeve comprises a pressure shoulder and said flange sections engage into said pressure shoulders.

4. The apparatus of claim 2, wherein said rolling contact wedge and prism, respectively, members are held fixed against a lateral movement within their respective cutouts.

5. The apparatus of claim 2, wherein the flange sections of a respective pivot section define a section of a circle extending less than 180°, and wherein the void space between these flange sections is bridged by said joint plates such that said flange sections of a respective pivot section are interconnected by said joint plates.

6. The apparatus of claim 2, wherein said joint plate projecting into said fork comprises at its face end a circularly extending apex section the center point of the circular line described thereby being located on the contact line of said rolling contact wedge and rolling contact prism member.

7. The apparatus of claim 6, wherein said forked joint plates are provided with a pin bridging the fork and located at a distance from said circular apex section such that upon a reversal of the reactive forces acting onto the apparatus said apex section will contact said pin at any angular position of said rigid cylindrical sleeves such that a collapse of the rolling contact rocker means defined by said rolling contact wedge and prism members is prevented.

* * * * *